No. 711,832. Patented Oct. 21, 1902.
L. C. DENISON.
ADJUSTABLE SIDE BEARING FOR CARS.
(Application filed June 26, 1902.)
(No Model.)
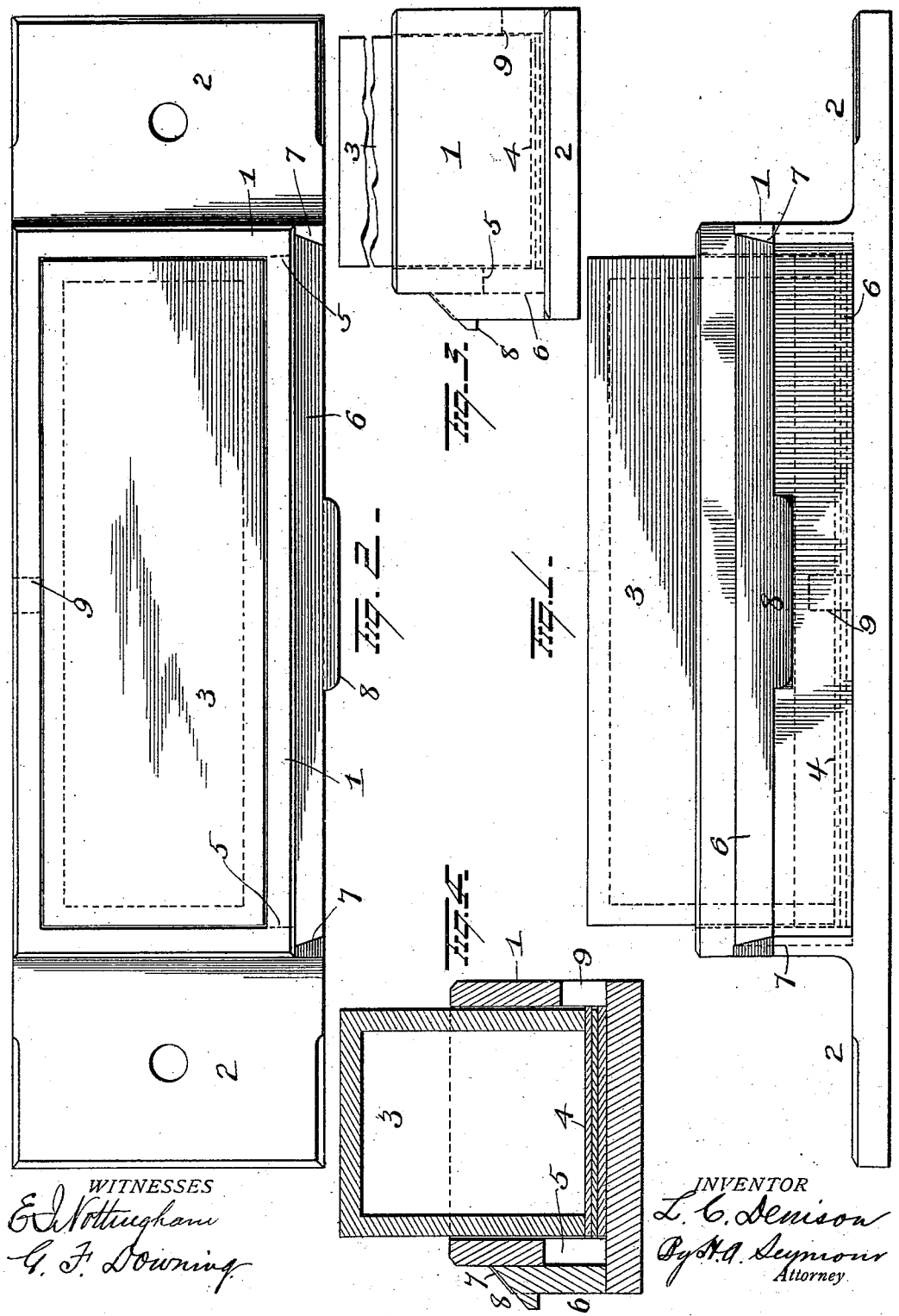
WITNESSES
INVENTOR
L. C. Denison
Attorney

UNITED STATES PATENT OFFICE.

LESTER C. DENISON, OF ANACONDA, MONTANA.

ADJUSTABLE SIDE BEARING FOR CARS.

SPECIFICATION forming part of Letters Patent No. 711,832, dated October 21, 1902.

Application filed June 26, 1902. Serial No. 113,267. (No model.)

*To all whom it may concern:*

Be it known that I, LESTER C. DENISON, a resident of Anaconda, in the county of Deerlodge and State of Montana, have invented certain new and useful Improvements in Adjustable Side Bearings for Cars; and I do hereby declare the following to be a full, clear, and exact description of the invention, such as will enable others skilled in the art to which it appertains to make and use the same.

My invention relates to an improved adjustable side bearing for cars, the object of the invention being to provide an improved side bearing which can be readily and quickly adjusted to give side clearance to the car, and, further, to provide a side bearing which can be secured upon the truck-bolster of cars now in use to replace the old expensive and unsatisfactory devices now commonly employed.

With this object in view the invention consists in certain novel features of construction and combinations and arrangements of parts, as will be more fully hereinafter described, and pointed out in claims.

In the accompanying drawings, Figure 1 is a side view. Fig. 2 is a top plan view. Fig. 3 is an end view, and Fig. 4 is a view in cross-section.

1 represents a bearing-box having lips 2 at each end perforated, as shown, to receive bolts to clamp the box upon the truck-bolster of a car. In box 1 a bearing-block 3 is located and is preferably cast hollow, as shown, for cheapness and lightness. This bearing-block rests upon shims 4, which are inserted and removed through an opening 5 in one side of the box normally closed by a slide 6, beveled at its ends and mounted to slide in grooves 7 in the box and provided with a handhold 8 to facilitate the removal of the slide when it is desired to remove a shim or place an additional one in the box. As the shims are liable to stick in the box, I provide a small opening 9 in the side thereof opposite to opening 5 to permit the entrance of a cold-chisel or other tool to dislodge them.

It will thus be seen that with my improvements when it is desired to adjust the bearing it is simply necessary to remove slide 6 and take out or put in the shims, as the case may be. The car need not be disturbed in this adjusting operation, and the shims may be of any desired thickness to secure the proper adjustment.

When old side bearings are removed from trucks, my bearing can replace them at greatly-reduced cost, and the expense of adjusting this bearing is only nominal, while with all others the expense of labor necessary to accomplish the adjustment of side bearings is very great.

A great many slight changes and alterations might be made in the general form and arrangement of the several parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a side bearing, the combination with a box having an opening through one of its walls for the admission of shims, of a bearing-block constructed to rest within the box and on the shims therein.

2. In a side bearing, the combination with a box having an opening in its side for the admission of shims, a slide to close said opening and a bearing-block in the box on the shims.

3. In a side bearing, the combination with a box to be secured on a truck-bolster and having an opening in one side for the admission or removal of shims to adjust the bearing, a slide to close said opening, a hollow bearing-block in the box supported on the shims and said box having an opening in its side for the admission of a tool to dislodge the shims.

In testimony whereof I have signed this specification in the presence of two subscribing witnesses.

LESTER C. DENISON.

Witnesses:
EMANUEL LARSON,
B. J. MCCUE.